March 18, 1941.　　　F. BACHMANN　　　2,235,663
VENTILATION AND TESTING DEVICE
Filed April 15, 1938
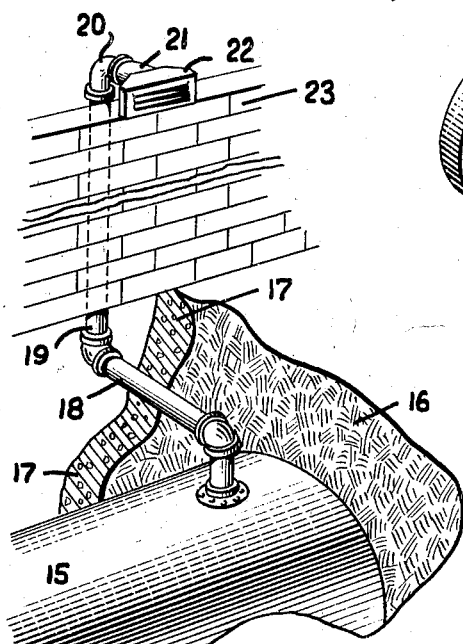
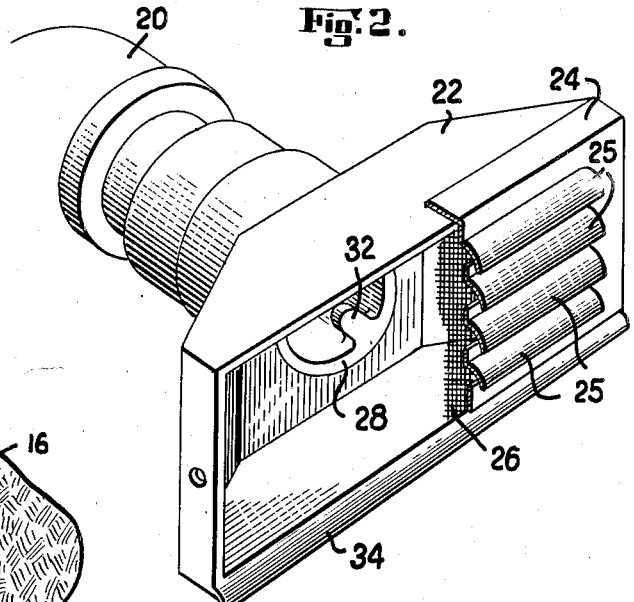
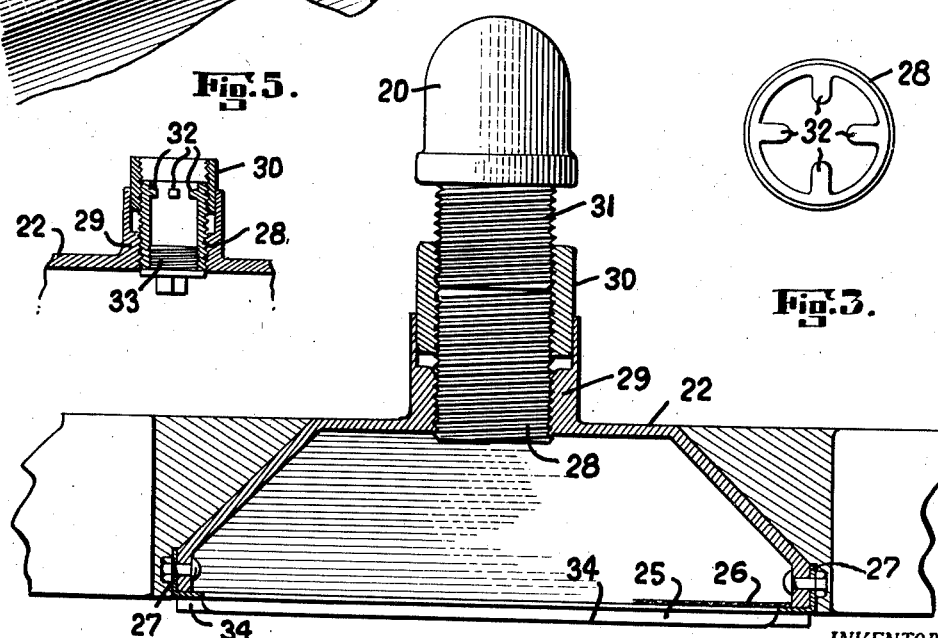
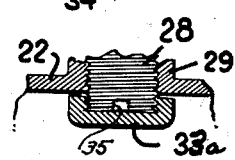
INVENTOR.
Frank Bachmann
BY Emery, Varney, Whittemore & Dix
ATTORNEYS.

Patented Mar. 18, 1941

2,235,663

UNITED STATES PATENT OFFICE 2,235,663

VENTILATION AND TESTING DEVICE

Frank Bachmann, New York, N. Y.

Application April 15, 1938, Serial No. 202,163

5 Claims. (Cl. 220—44)

This invention pertains to an improved form of ventilating and testing device to be connected to storage tanks that receive volatile and other fluids.

More in particular the invention relates to an improved construction of over-flow vent devices that are easily assembled in a building wall and connected to a tank which is usually placed underground, and which device is adapted to receive a plug or other leak-stopping means, without disassembling any of the piping, so that the storage tank may be readily tested from the outside of the house or building for pressure and leakage.

For purposes of reducing fire and explosion risks with storage tanks for volatile fluids, or even those tanks which store relatively heavy oil for oil burners and the like, there have been many devices to meet the requirements to provide proper ventilation and for the testing of those storage tanks.

It is particularly desirable to provide a suitable ventilating means for tanks that are positioned in cellars, or even under the side walls of a building, and to have such ventilating devices allow for over-flow of the fluid, and to have these devices so constructed that the passageway to the tank may be plugged up and the tank tested as to pressure and leakage.

Different municipalities have different requirements as to protection for storage tanks of this nature. In the ventilating devices which have heretofore been used, it has been found that they meet the requirements as to ventilation and overflow, but that do not allow for testing of the tanks to thereby learn of leakage and strength of the tank without disassembling some of the parts thereof.

It is a feature of the invention herein to provide an improved ventilating and testing device which is connected to storage tanks for volatile and other liquids, and which function to provide all of the desirable features for ventilating, overflow and testing for pressure and leakage.

It is another feature of this invention to provide a new type of tank ventilating and testing device which will permit testing of the tank as to pressure and strength and to have the test carried on from the exterior of the building.

It is also a feature of this invention to provide a novel simple structure of relatively small size of a device to carry on the functions herein presented.

Another feature of the invention is to provide an improved device which may be readily removed from a wall without in any way damaging the wall, and to easily release the piping to which the device is connected without disassembly of substantially all of the piping from the storage tank to the ventilating and testing device.

The novel type of construction is particularly advantageous as the prior types of ventilating devices required the removal of considerable amounts of the building wall in order to disassemble the device from the piping connected to the storage tank in order to carry on the tests as to leakage and pressure.

A still further feature is to provide a simple type of testing device which includes a relatively small box-like structure or member which is readily connected in a leak-proof manner to the piping leading to the storage tank, and to provide this box so that it may readily be removed without damage to the building wall, and to have its space covered over by a replacement such as a brick, or board, or small stone, or the like.

Further features and advantages of the invention herein will be appreciated as the detailed description illustrated in the drawing is presented. In this drawing:

Fig. 1 is a perspective view of one of these ventilating devices, mounted in a building wall and connected by piping to a storage tank located underground just outside of the wall.

Fig. 2 is an enlarged perspective view of the improved ventilating and testing device of the invention herein.

Fig. 3 is a top plan view, partly in section, of the installation of an improved ventilating and testing device of this invention.

Fig. 4 is an end view of one of the portions of the connecting device showing a type of wrench-engaging means;

Fig. 5 is a view, partially in section, of another type of connecting means forming part of the ventilating and testing device of this invention; and Fig. 6 is a view, partly in section showing another type of closure element.

Referring now to Fig. 1, a storage tank 15 for receiving volatile and other types of liquids, is shown as placed under the ground 16, and in proximity to cellar wall 17. Conduit means as piping 18 and 19 lead to an elbow 20 which, in turn, receives a portion of the ventilating and testing device generally indicated at 21. A portion of this ventilating device which will hereinafter be called a box or member 22, is shown as being like a hollow rectangular body and as approximating the size of one of the bricks in a building wall 23.

The height of the wall is shown broken as various municipalities require the box 22 to be located at various heights above the ground. Normally the height of location is about 5 feet so that it may readily be seen from the point of filling. Also, such height normally prevents young persons from inserting extraneous objects or articles into the ventilating device and normally prevents water from splashing into the same. In addition, this height gives a little more added storage capacity to the tank 15.

It is usual that the front of the box or member 22 shall be provided with a suitable cover 24 having openings or perforations of some form. In this instance the cover has protruding vanes 25 which have one end broken away from the cover and pushed outwardly, thereby providing openings from the interior of the box to the atmosphere. It is usual to provide a screen 26 to be placed just back of the cover 24.

This cover 24 may be fastened to the number 22 in any suitable manner. In this illustrated instance one of the attachments is shown as a bolt and nut wherein the bolt passes through the sides of member 22 and through flange 27 of the cover. It is particularly desirable to have the cover fastening arrangement hidden, or at least positioned so that youngsters cannot easily take it off such as would be the case if the cover were fastened by screws passing through the front of the cover 24.

In the particular type of fastening means herein shown the cover is fastened during assembly by employing a little wrench on the nuts to tighten them, and then inserting some mortar or pieces of putty over the nuts to fill the depressions and make them flush with the building wall.

Referring now particularly to Figs. 2 and 3, the illustrated ventilating and testing device is preferably composed of a box or member 22, and suitable means for connecting the same in non-liquid leaking engagement with elbow 20. In this preferred form of the device there is provided a first nipple 28 which is known as a through nipple. This nipple engages the screw-threaded coupling 29, which preferably is positioned at the back or rear of box 22, and extends therethrough to engage a coupling 30. There is also provided a second nipple 31 which screws into elbow 20 and into the coupling 30.

In assembling this ventilating and testing device in position it is usual to insert nipple 31 into elbow 20 and then to screw the coupling 30 part way on to the nipple 31, and then to introduce the box or member 22 in its desired position in the building wall and set it with mortar. Thereafter nipple 28 is screwed into coupling 29 and into coupling 30. Projections 32 are provided on the interior of nipple 28 to receive a wrench for the moving of this nipple 28 into position to thereby draw the parts together and make a tight connection for the coupling 30 will be drawn toward the member 22. Instead of projections 32 the nipple may be provided with several slots 35 in the end so as to receive a suitable wrench or handle for screwing the nipple into position or for removing the same. The nipples and couplings should provide a non-leaking liquid connection between the elbow 20 and the box or member 22. If desired a single through nipple extending from coupling 29 to elbow 20 may be employed.

When it is desired to test tank 15 for leakage and strength or for other reasons, it is very simple to accomplish this purpose from the exterior of the building wall by simply providing a closure or blocking element or plug 33 and inserting it into nipple 28 after removing cover 24 and screen 26 as shown in Fig. 5. This plug 33 may be provided, if desired, with a flange to engage the end of the nipple. After the plug is properly located, then pressure may be applied to the tank from the filling end and in the event the pressure keeps dropping, then repairs are to be made. If the pressure maintains then the tank may be approved as being in a satisfactory condition. The amount of pressure will indicate the strength of the tank. Another manner of closing the ventilating and testing device to the tank is by employing a cap 33a over an end of through nipple 28 as shown in Fig. 6.

It has long been desired, in connection with storage tanks, to be able to test them from the exterior of buildings. The herein improved structure permits such testing. In addition this type of testing device does not require the breaking down of any of the piping 18, 19, or 20. Heretofore in such tests it has been usual to remove the pipe 19 and place a plug in the elbow in order to stop up the tank.

After the testing of the tank by the improved structure herein, the plug 33 or cap 33a is easily removed and the screen 26 and cover 24 are readily replaced. Most communities require the testing of storage tanks every year and substantially always within two years.

In communities or at storage places where it is not necessary to have tanks tested, then the type nipple 28 as shown in Fig. 2 may be employed where the projections 32 are on the front end.

Any type of box or member 22 may be employed so long as air is allowed to reach the piping to the storage tank and the piping and box permit proper over-flow of the liquid from the tank in the event it is filled too full.

It is usually desired that the box be of rectangular structure and fit into a wall without creating or striking a contrast. The cover may be painted as desired.

In the specific structure herein shown, box or member 22 is of a cast-iron having its forward opening a little less than the area of a brick. The lower edge of this opening preferably is provided with an apron 34 so that, in the event any oil or liquid overflows, it will usually drip from apron 34 to the ground and not run down the side of the building wall. It is preferred to have the height of this box or member 22 substantially that of a brick, and to keep the connecting piping within that height. Any suitable means may be employed for obtaining a leak-proof connection between the box 22 and the piping leading to the tank. In this illustration the second or rear opening of the member 22 forms the coupling 29. Any other means for connecting the box to the elbow 20 may be employed. It is desirable, however, that the connection which engages the coupling 29 shall be such that it may readily receive a plug or be capped.

The box may be made of any suitable material which has the strength and wearing capacity and admits of leak-proof connection with elbow 20, and which will properly receive a plug 33 or the like for testing. Cast iron has been found to be very satisfactory although sheet metal and the like may be employed. The size of the box or member 22 has been purposely designed to be approximately the size of a brick so that it may easily be inserted in a building wall, or may easily be removed therefrom without in any way damaging the wall.

It will be noted from the foregoing description that a novel and improved type of ventilating and testing device for storage tanks is provided, and that this device allows testing of the tanks from the outside of a house or building, and may be inserted or removed without in any way damaging the building wall.

This improved device allows for the testing of a tank in a very efficient and quick manner and without requiring the disassembly of any of the piping between the device and the storage tank.

It will be understood that one or more tank outlets may be connected to a single box.

It will also be understood that the projections 32 may be made of small size so as not to limit the capacity of the nipple. In the event these projections are thought to limit the flow capacity, a larger size diameter may be employed.

Various modifications and changes may be made in the construction and connections herein described as an example, but such modifications and changes are considered as being within the scope of the invention herein as presented in the following claims.

I claim:

1. In combination a supply tank, a conduit leading from said tank, a member positioned in a building wall, said member having an opening in the front thereof leading to the exterior of the wall, an attachable cover for said opening, said cover having openings therein for the passing of air and liquid through said member, a second opening in said member, a connection engaging said member at the second opening and engaging said conduit, both engagements being non-leaking, a portion of said connection adapted to receive a plug without removing said member from the wall to allow testing of the tank for pressure.

2. A ventilating and testing device for attachment to piping leading from storage tanks, comprising a box adapted to be positioned in a building wall, said box having a substantially wide opening in front, and having a screw threaded coupling portion in the back thereof for receiving a connection engaging the piping from said tank, said connection being provided with a screw thread part for receiving a plug or cap for closing said connection during testing of said tank, a screen mounted over the front opening of said box, and a cover having openings therein mounted near said screen.

3. In a ventilating and testing device for tanks, the combination of a box having an opening in the front thereof, said box having a portion in the rear thereof provided with an opening which is screw-threaded on its interior, a through nipple positioned in said rear opening, a coupling engaging another portion of said through nipple, a second through nipple engaging said second coupling and extending to piping leading from a tank, said first nipple being provided with internal screw threads, a blocking element adapted to be inserted in said internal screw threads to block the passageway to said tank while testing said tank for leaks and pressures.

4. In a ventilating and testing device for tanks the combination of a rectangular member having one face thereof open, a screen adapted to be placed over said opening, a perforated cover adapted to be placed over said screen and firmly held to said box, said member having its bottom edge provided with an apron extending outwardly and downwardly, a rearward extension on said box for forming an opening and providing a screw-threaded coupling, an annular skirt extending from said coupling, a through nipple adapted to engage said coupling, a second coupling adapted to engage the other end of said nipple, and a second nipple which engages said coupling and piping leading to a storage tank.

5. In combination a tank to be tested, piping leading from said tank to a point a relative distance from said tank, a box of rectangular structure positioned in a building wall away from said tank, said box having an opening in the front thereof, a screen positioned over said opening, a perforated cover positioned over said screen and being firmly affixed to said box, a screw-threaded opening in the rear of said box, a connection between said opening and said piping, said connection being provided with means for receiving a closure element to prevent movement of air or liquid through said box during the setting up of pressures in said tank for testing the tank as to leakage and pressures.

FRANK BACHMANN.